Oct. 19, 1954 A. E. ARENA 2,691,848
PLANT PROTECTOR
Filed Oct. 29, 1951 2 Sheets-Sheet 2

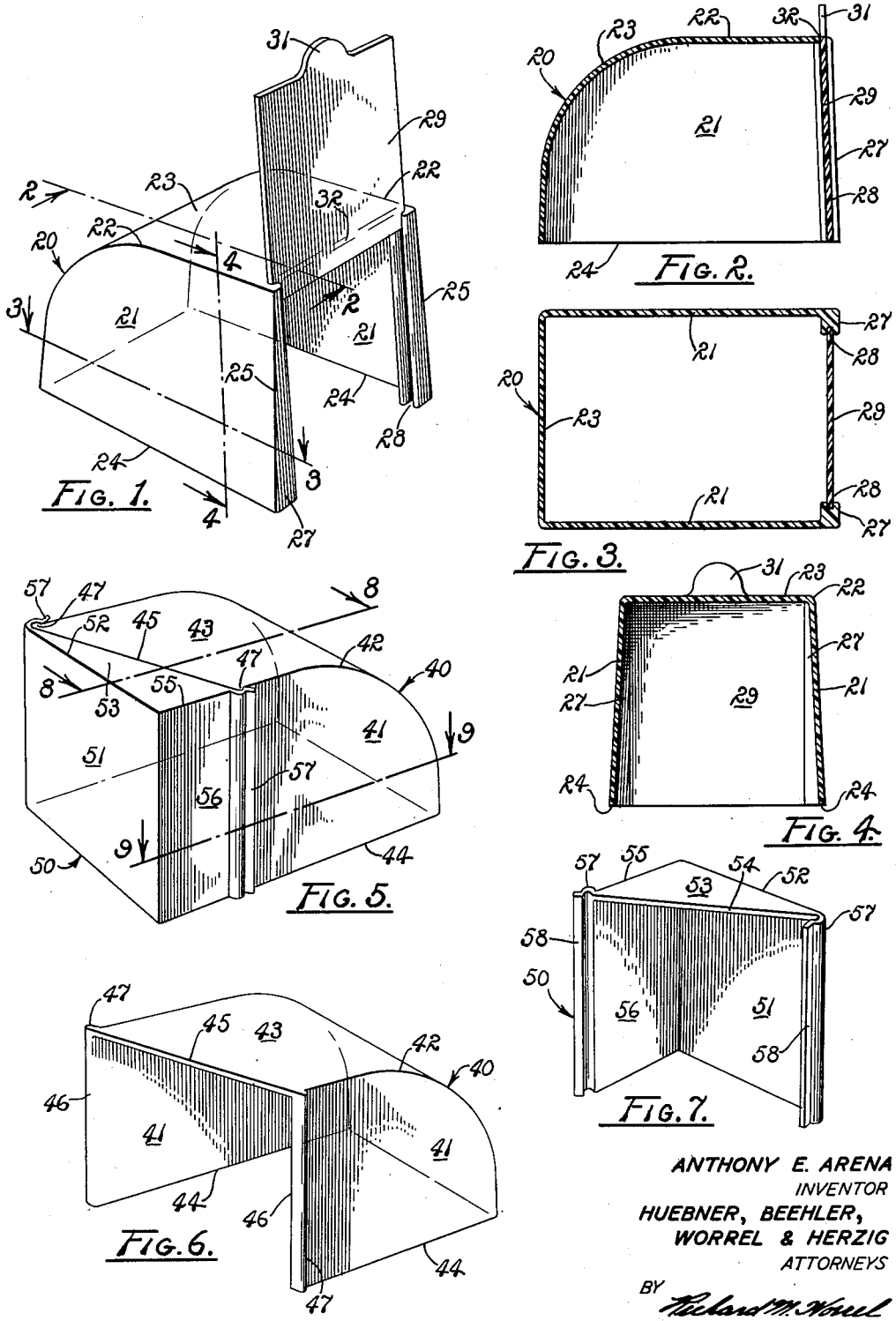

ANTHONY E. ARENA
INVENTOR
HUEBNER, BEEHLER,
WORREL & HERZIG
ATTORNEYS

Patented Oct. 19, 1954

2,691,848

UNITED STATES PATENT OFFICE 2,691,848

PLANT PROTECTOR

Anthony E. Arena, Visalia, Calif.

Application October 29, 1951, Serial No. 253,671

2 Claims. (Cl. 47—26)

The present invention relates to plant protectors and more particularly to protectors adapted to shield tender plants and the like from unfavorable weather conditions, predatory animals, birds and insects, and that is adjustable for ventilation purposes and to accommodate and direct plant growth.

Conventional plant protectors are of two general types; permanent and semi-permanent hot houses, seed bed covers, planting boxes, and the like consisting of rigid frames supporting glass panels in housing relation to an area or crop to be protected; and disposable hot caps of wax paper or the like adapted for field use. Both types of plant protectors are subject to certain disadvantages which the subject invention seeks to overcome.

Hot houses and the like are expensive to construct, are either immovable, or movable only with considerable difficulty and hazard, and are generally unsuited to field use.

So-called hot caps are generally economical to employ but provide no ventilation, cannot accommodate plant growth beyond their predetermined limits without at least partial destruction, and once ruptured or removed for ventilation purposes cannot be conveniently reconditioned for plant protective purposes in the event of an unexpected decrease in environmental temperature. It is the usual practice to mount hot caps in covering relation to plants to be protected in such a manner that the plants receive no ventilation until after the danger of frost has past. Lack of ventilation, of itself, tends to impede plant growth. When it is felt that there is no longer a frost hazard, openings are usually torn or cut in the hot caps. Although it is the intention that the plants grow from the hot caps through the openings thus formed, frequently the plants become so entangled that they are unable to seek the openings. Such plants must be tediously untangled and threaded through the openings. Inasmuch as conventional hot caps cannot be closed once they have been opened, as a precaution the opening is delayed as long as possible and thus the entangling of the plants and the inhibiting of their growth aggravated.

An object of the present invention is to provide an economical plant protector for field use that is adjustable for ventilation and plant growth directing purposes.

Another object is to provide a plant protector for field crops of a form suited to repeated use and compact nesting for storage when not in use.

Another object is to provide a plant protector of the character described that is conveniently portable, durable in structure, and expeditiously positioned in covering relation to a seed bed or plants to be protected.

Another object is to provide a protector having an opening therein and means for adjustably closing the opening.

Further objects and advantages will become apparent in the subsequent description in the specification.

Referring to the drawings:

Fig. 1 is a perspective view of one form of the protector of the present invention showing a closure member or door slid to open position from an open end of the protector.

Fig. 2 is a longitudinal vertical section through the protector, as viewed from line 2—2 of Fig. 1, but with the closure member slid downwardly to closed position.

Fig. 3 is a longitudinal horizontal section through the protector as taken along line 3—3 of Fig. 1.

Fig. 4 is a vertical transverse section through the protector, as viewed from line 4—4 in Fig. 1.

Fig. 5 is a perspective view of a second form of the subject invention.

Fig. 6 is a perspective view of a housing portion of the second form of the invention showing an open end thereof.

Fig. 7 is a perspective view of a closure member for the opening of the second form of the invention.

Figure 8:
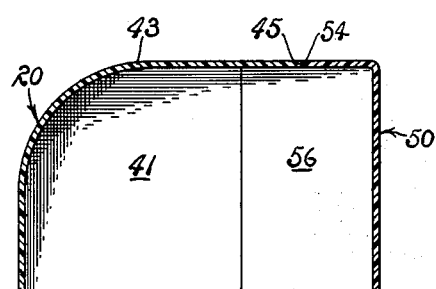
Fig. 8 is a vertical longitudinal section through the second form of the invention, as viewed from line 8—8 in Fig. 5.
Figure 9:
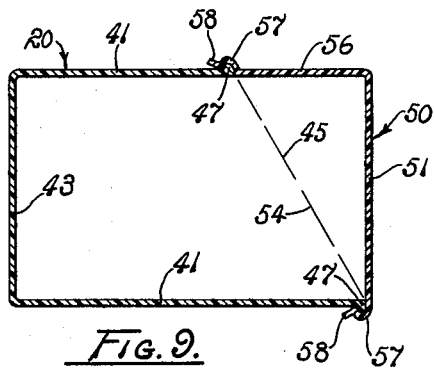
Fig. 9 is a horizontal longitudinal section through the second form of the protector, as taken along line 9—9 in Fig. 5.

Referring in greater detail to the drawings:

FIRST FORM

The first form of the present invention illustrated in Figs. 1 to 4, inclusively, is provided with a housing indicated generally by the reference numeral 20. The housing is made of transparent or translucent sheet material, either molded or fabricated into a thin-walled structure. The material is preferably, substantially impervious to water and air and capable of admitting heat and light rays for frost resistant and plant forcing purposes. Oiled or waxed paper, Celluloid, cellophane, cellulose acetate, ethyl cellulose, polyvinyl chloride, vinyl chloride-acetate copolymers, polyvinylidene chloride, polyvinyl butyral, polyvinyl alcohol, polyethylene, acrylic, polystyrene, rubber hydrochloride, polyester allyl and the like are suitable when economically obtainable. The thickness of the material employed in the housing is determined in large measure by the character of the material. In all instances it should be thick enough to impart sufficient rigidity to the housing for shape maintaining purposes and yet possess sufficient flexibility for convenience in nesting for storage purposes, as will soon become apparent. Simple experimentation readily determines the most desirable thickness for any material utilized.

Although the housing 20 can be of any desired size and shape, that shown in Figs. 1 to 5 provides a pair of upwardly convergent side walls 21 arranged in spaced relation. Each of the side walls provides an arcuate upper edge 22 and the side walls are interconnected by an arcuate cover panel 23 fitted to the upper edges of the side walls. The cover panel and the side walls conveniently provide lower edges 24 in a common plane. Each of the side walls provides a substantially erect forward edge 25 in substantially right angular relation to its respective lower edge 24.

A marginal panel 27 is inwardly extended from each of the forward edges 25 and provides an inwardly disposed channel 28. The channels 28 are in substantially parallel relation and juxtapositioned to receive a closure member or door 29 slidably therein. The side walls 21, cover panel 23, and marginal panels 27 are integral and, as previously discussed, may be cast, fabricated from suitable sheet material, or otherwise formed as desired.

The closure member 29 is preferably substantially rectangular in form and provides an upwardly disposed tab 31 for grasping convenience. The cover panel 23 provides a forward edge 32 in slidable engagement with the closure member. As shown in Figs. 2 to 4, when the closure member 29 is slid downwardly in the channels 28 a substantially water- and air-pervious housing is formed. Frictional engagement of the edges of the closure member 29 in the channels 28 and with the forward edge 32 of the cover panel 23 permits the elevating of the closure panel to any desired position in the channels and the maintenance of the closure member in such position. Thus the open forward end of the housing 20 between the marginal panels 27 may be adjustably enlarged or decreased as temperature variations, desired ventilation and plant growth require. The frictional engagement of the side edges of the closure member 29 in the channels 28 is increased, when desired, by piling earth, not shown, externally against the lower edges of the downwardly divergent side walls 21 to urge the side walls inwardly. The flexible sheet material of the protector is such that the compacting of the earth can regulate the frictional engagement described to hold the closure member in desired position. Such earth also serves dependably to locate the protector in position. Obviously, if the frictional engagement of the closure member 29 on the channels 28 is too great, it can conveniently be reduced by simply spreading the lower edges of the side walls 21.

SECOND FORM

The structure of the second form of the present invention is shown in detail in Figs. 5 to 9, both inclusive. The second form utilizes a housing 40, which like the housing 20 may be of any suitable form but which includes a pair of substantially erect parallel side walls 41. The side walls 41 have arcuate upper edges 42 interconnected by an arcuate cover panel 43. The side walls and cover panel have lower edges 44 preferably in a common plane. The cover panel has a forward edge 45 oblique to the side walls 41. The side walls have forward edges 46 in a vertical plane common to the forward edge of the cover panel 45, and thus one of the side walls is appreciably longer than the other. An outwardly directed bead 47 is formed along each of the forward edges 46.

The housing 40 is provided with a complementarily shaped closure member 50 which, as shown in Fig. 7 is substantially cuneiform. The closure member provides a substantially rectangular end wall 51 having a width substantially equal to the spacing of the side walls 41, and a height substantially equal to the spacing of the cover panel 43 from the lower edges 44 at the forward end of the housing. The end wall provides an upper edge 52 which mounts a triangular upper panel 53 in substantially right angular relation to the end wall 51. The triangular upper panel has a hypotenuse 54 in abutting relation to the forward edge 45 of the cover panel 43 and an edge 55 of a length substantially equal to the difference in lengths of the side walls 41. A closure side wall 56 having a length substantially equal to the edge 55 and a height substantially equal to the end wall 51 and side walls 41 is connected to the upper panel 53 along the edge 55 and to an edge of the end wall 51. The side wall 56 is substantially aligned with the shorter of the side walls 41. Resilient clasps 57 are formed integrally with the end wall 51 and side wall 56, respectively for releasable engagement with the beads 47. As clearly evident in Figs. 5, 7 and 9, the clasps 57 preferably have arcuately outwardly directed marginal edges 58 which facilitate releasable association of the closure member 50 with the housing 40.

The second form of the present invention like the first form may be cast, fabricated or otherwise formed in any suitable manner of any desired transparent or translucent material that is substantially impervious to water and air and provides the described slightly flexible characteristics.

OPERATION

*First form*

The first form of the plant protector of the present invention is stored by nesting the housings 20 one within the other either with the closure members 29 in position in the channels 28 or removed therefrom as convenience suggests.

In use, the housing 20 is located over a seed bed or plant to be protected, not shown, and the closure member 29 slid downwardly into closing position, as shown in Fig. 2. The forward end of the housing 20 in which the closure member 29 is mounted, is preferably faced to the east or to the north so that when the closure member is elevated, or removed, direct sunlight is not admitted to the housing through the opening thus disclosed during the hottest part of the days and for plant growth directing purposes described in greater detail in connection with the second form of the invention.

With the closure member 29 in closed position, seeds, plants, and the like contained by the housing 20 are shielded against low temperatures, winds, and damage incident to precipitation. Light rays and radiant heat waves passing through the housing heat the interior thereof in the well known manner. Radiation of heat from the earth is minimized by the housing by the reflection of such radiant heat inwardly of the housing by the cover panel 23.

As the damage of frost decreases and/or plants within the housing 20 require more room, the closure member 29 is elevated or removed as desired. The opening thus revealed not only provides ventilation within the housing but aids in the directing of plant growth, a significant feature illustrated in greater particularity in Fig. 10 in connection with the second form of the invention. In the event of an unexpected decrease in field temperature, the closed member 29 is slid downwardly into closing position to reestablish effective protection against such decrease.

*Second form*

Figure 10:
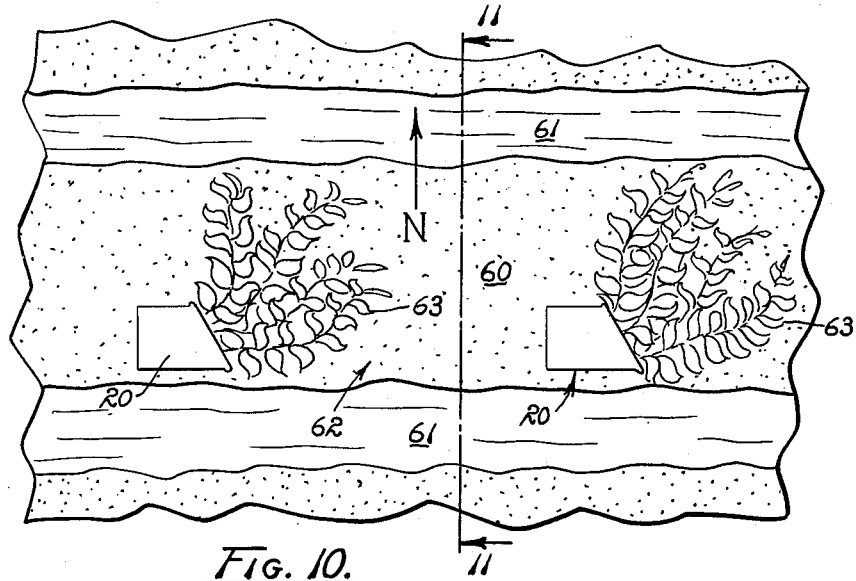
Fig. 10 is a top plan view of the second form of the present invention in use in a field.
Figure 11:
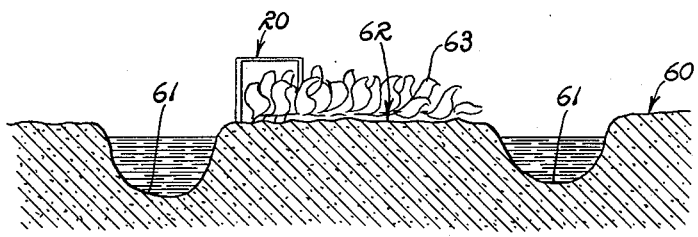
Fig. 11 is a vertical section taken on line 11—11 of Fig. 10.

In Figs. 10 and 11 a crop producing field is exemplified at 60 having parallel irrigation furrows 61 formed therein defining elevated seed beds 62. The ditches and beds exemplify conventional field cultivation for the types of crops normally requiring protection from unfavorable weather. The irrigation furrows 61 preferably run east and west so that one edge of the seed bed 62 receives the advantage of increased warmth from sunshine received at the edge of an adjacent furrow. Seeds or small plants, not shown, of the crop to be produced are planted in the seed beds 62 at the warmer edge thereof. The housings 40 with the closure members 50 mounted thereon by releasable engagement of the clasps 57 with the beads 47 are positioned in housing relation to such seeds or small plants with the closure members preferably disposed toward the east. So positioned, the second form of the present invention, like the first form, provides protection of the seeds or plants against unfavorable weather and predatory animals, birds, or insects. If desired, dirt can be heaped about the lower edges 44 to aid in maintaining the housings in position. When the danger of frost is past and/or plants contained in the housings 40 require additional space, the closure members 50 are removed from the housings 40 opening an entire end of the housings. Even with the closure members thus removed, appreciable protection against frost is afforded and ventilation of the housings permitted. It has been found that the plants seek the opening caused by the removal of the closure members 50 and grow from the housings, as shown at 63. The oblique open ends of the housings 40 are directed to the north and the east and as the plants grow they tend to spread across the seed beds 62 and by the positioning of the longer side wall 41 adjacent to the nearest irrigation furrow the conventional tendency of the plants to grow into the furrow is minimized. Inasmuch as a substantial portion of the expense of producing field crops grown, as shown in Figs. 10 and 11, results from the necessity of lifting portions of the plants from the irrigation furrows to confine them to the beds 62, the growth directing properties of both forms of the present invention are of substantial significance.

Both forms of the present invention are economical to produce, conveniently stored in nested relation, easily installed, afford protection of housed seeds, plants and the like against unfavorable weather and predatory animals, birds and insects, are adjustable to permit ventilation, may be opened and closed as frequently as weather changes suggest, and accomplish the described plant growth directing function.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention what I claim as new and desire to secure by Letters Patent is:

1. A plant protector comprising a housing of light transmissible flexible sheet material closed at the top thereof and having opposite side walls, opposite end walls and a downwardly disposed edge adapted for rested engagement on the ground and defining a downwardly disposed opening, said housing being divided into a pair of separable portions having adjacent edges, the edges of one of the portions at opposite sides of the housing providing a pair of outwardly disposed substantially parallel elongated beads in a common plane transversely of the housing, and corresponding edges of the opposite portion providing resilient arcuate clasp formations integral therewith fitted outwardly over the beads.

2. A plant protector of light transmissible sheet material comprising a pair of spaced side walls each having a lower edge, a forward edge in substantially right angular relation to the lower edge, and a convex upper and rearward edge, one of said side walls being appreciably longer than the other side wall and each side wall having an outwardly disposed elongated bead formed along the forward edge thereof; a cover panel integral with the side walls interconnecting the upper and rearward edges thereof with the side walls in predetermined spaced relation and defining a ventilation opening between the forward edges thereof, said panel having a forward edge oblique to the side walls in a plane common to the forward edges of the side walls; and a closure member engageable with the beads releasably mounted in closing relation to the ventilation opening, said closure member having a substantially erect end wall of a length substantially equal to the spacing of the side walls of the housing and a height substantially equal to the height of the side walls, a triangular upper panel integral with the end wall extended substantially horizontally from the upper edge thereof and having a hypotenuse edge in abutting relation to the oblique forward edge of the cover panel and a side edge of a length substantially equal to the difference in lengths of the side walls of the housing, a side wall integral with the top panel and end wall in substantial alignment with the shorter side wall of the housing, and an arcuate clasp portion extended from a side edge of the end panel and from an edge of the side panel of the closure member releasably engageable with the beads of the housing.

References Cited in the file of this patent

UNITED STATES PATENTS

| Number | Name | Date |
|---|---|---|
| 38,656 | Crozier | May 26, 1863 |
| 1,080,622 | Barrie | Dec. 9, 1913 |
| 1,172,983 | Green | Feb. 22, 1916 |
| 1,239,994 | White | Sept. 11, 1917 |
| 1,257,898 | Lorence | Feb. 26, 1918 |
| 2,062,789 | Keller | Dec. 1, 1936 |
| 2,109,426 | King | Feb. 22, 1938 |

FOREIGN PATENTS

| Number | Country | Date |
|---|---|---|
| 5,764 | Great Britain | Apr. 4, 1889 |